Aug. 31, 1937.    F. W. KRAMER    2,091,509
INDEPENDENT WHEEL MOUNTING
Filed Dec. 14, 1936    2 Sheets-Sheet 1

INVENTOR.
F. W. Kramer,

Christian R. Nielsen,
ATTORNEY.

Aug. 31, 1937.   F. W. KRAMER   2,091,509
INDEPENDENT WHEEL MOUNTING
Filed Dec. 14, 1936   2 Sheets-Sheet 2

INVENTOR
F. W. Kramer,
Christian R. Nielsen
ATTORNEY

Patented Aug. 31, 1937

2,091,509

UNITED STATES PATENT OFFICE 2,091,509

INDEPENDENT WHEEL MOUNTING

Fred W. Kramer, New Orleans, La.

Application December 14, 1936, Serial No. 115,863

4 Claims. (Cl. 180—72)

This invention relates to wheel mountings and more particularly to the type wherein each wheel is independently movable in a vertical plane, and it consists in the constructions, arrangements and combinations herein described and claimed.

It is the cardinal purpose of the invention to provide individual wheel mountings embodying structure permitting each wheel to react, separately, to road shocks, thereby reducing side sway of the vehicle to a minimum, and to give definite clearance to wheels above water line when the vehicle is used as a conveyance on water.

It is a further object of the invention to provide a wheel mount in which the supporting axles of the wheels may be raised and lowered with respect to the body of the vehicle, thereby providing variable height adjustments to suit road conditions, or for the purpose of raising the car for facility in making repairs.

It is a further object of the invention to provide a wheel mount in which the wheel will be positively driven.

Additional objects, advantages and features of invention will be apparent from the following description considered in conjunction with the accompanying drawings, wherein Figure 1 is a longitudinal sectional view through a wheel mounting showing my invention.

Figure 1:
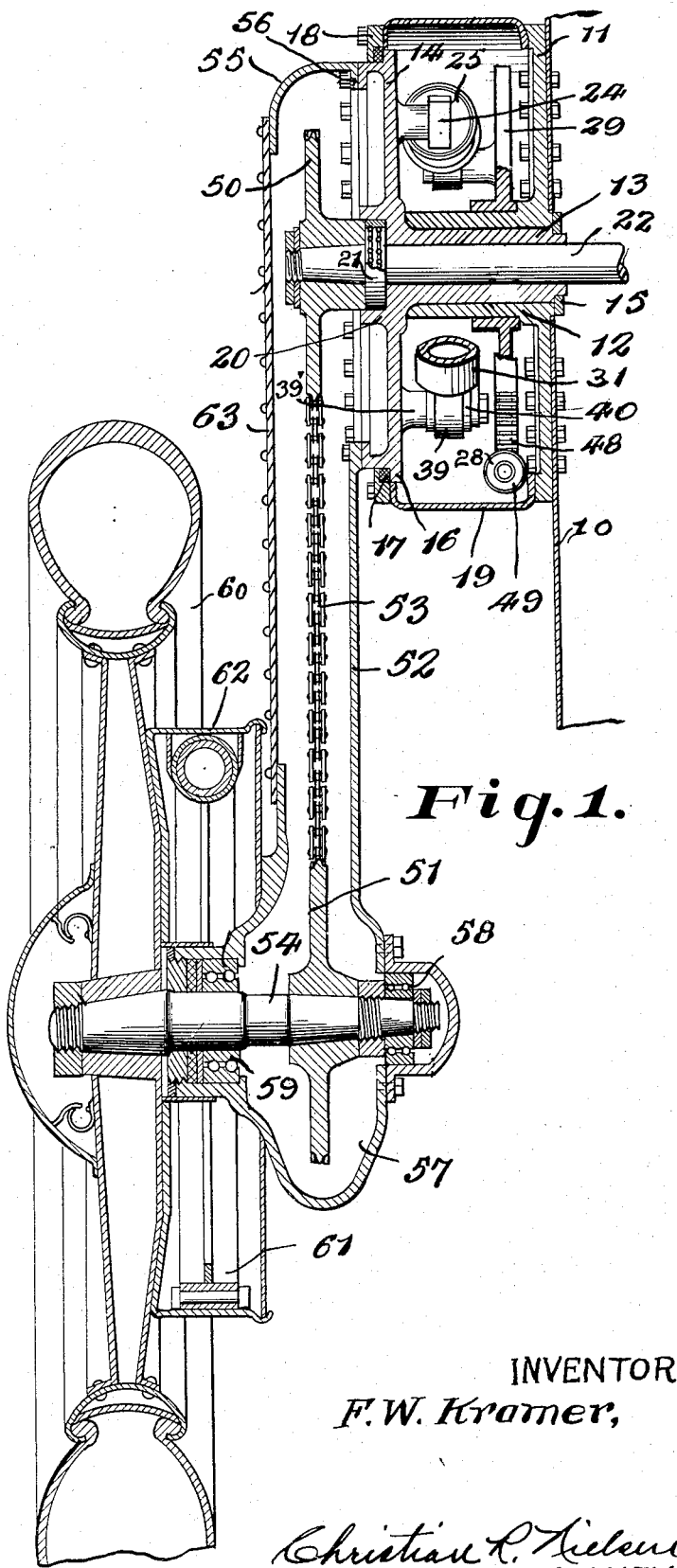

Referring to the drawings and particularly Figure 1, there is illustrated a portion 10 of a vehicle, which may be the chassis of the vehicle or otherwise, to which there is bolted a main support disk 11, the latter having a right angularly disposed hub 12, within which a hub 13 of an oscillatable disk 14 is journalled, the hub 13 being of a length projecting through the plate 11 and secured by any suitable means, as at 15.

The disk 14 is circumferentially flanged as at 16, forming a seat for an annular packing ring 17, and cooperable with the ring and flange there is a retainer ring 18, bolted to an annular casing 19, the opposite side of which is rigidly connected with the plate 11. Axially of the disk 14 and aligned with the bore of the hub 13, an annular boss 20 is provided, receiving a ball race 21, and through the alined ball race and bore of the hub a driven shaft 22 is journalled. The shaft 22 may be driven from the differential of the vehicle in any approved manner.

Upon the interior face of the disk 14 there is formed a stud 23 having a reduced threaded shank upon which an ear 24 of a shock absorbing cylinder 25 is pivotally mounted and secured thereon by a nut 26. The cylinder 25 is of arcuate shape and houses a piston 27 shaped for reciprocatory movements therein against the action of springs, as will be presently explained. The piston 27 has its outer end apertured and receives a stud 28 integrally formed upon an annular adjusting disk 29 mounted upon the hub 12.

Figure 2:
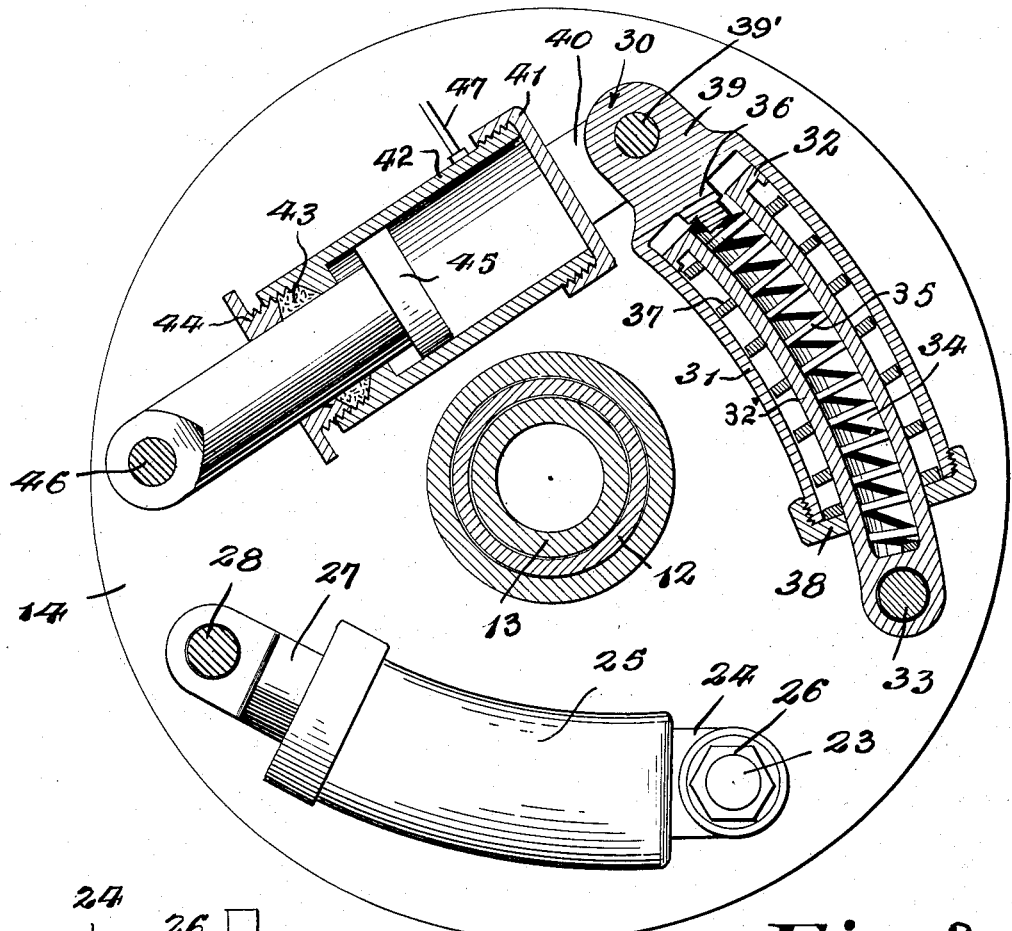
Figure 2 is a plan view of the oscillatable disk embodied in the device, illustrating the mounting of the shock absorbing means.
Figures 3, 4:
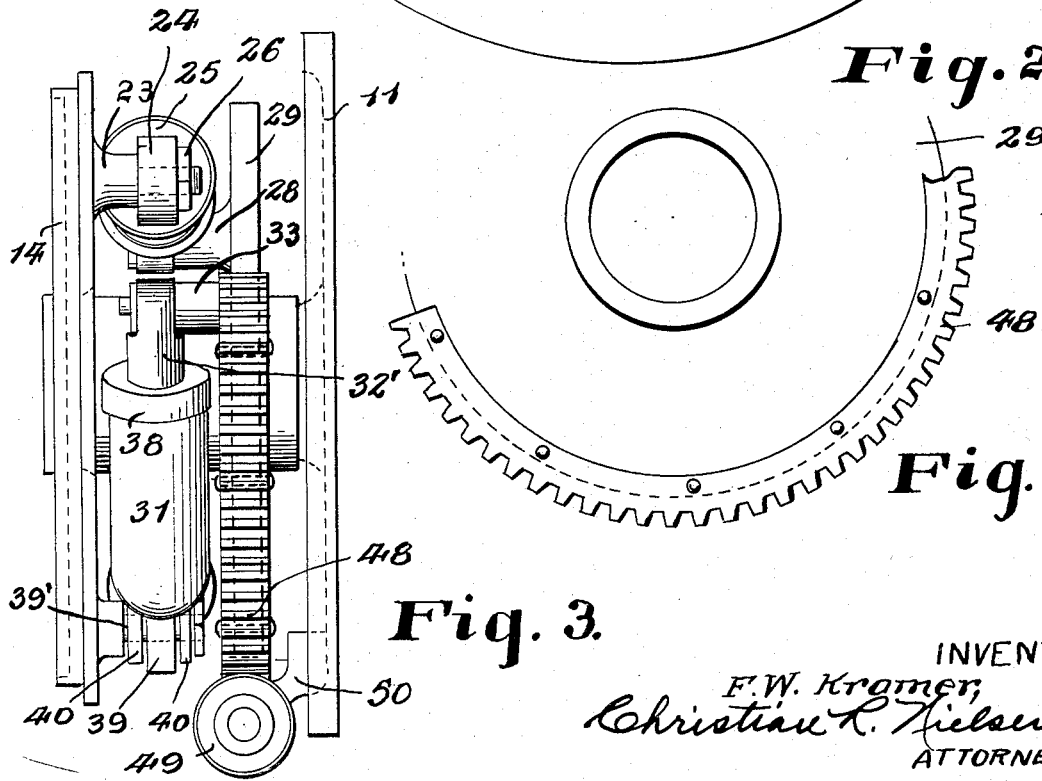
Figure 3 is an edge view of the assembly.
Figure 4 is a fragmentary plan view of the combined disk and gear employed in the device.

A combined hydraulic and spring shock absorbing means, generally indicated at 30, is interconnected between the oscillatable disk 29 and the disk 14, as will now be described. An arcuate shaped cylinder 31 is employed, in which a piston 32 is reciprocably mounted, the outer end of the rod 32' thereof being apertured to receive a stud 33 mounted in the adjusting plate 29. The rod 32 is formed with an arcuate-shaped bore 34, extending longitudinally thereof, closed at its lower end and open at the head of the piston, and in this bore there is disposed a spring 35 (see Figure 2). Thus, one end of the spring 35 rests in the closed end of the bore, while the opposite end of the spring encircles a lug 36 formed in the base of the cylinder 31. A heavy coil spring 37 is mounted in the cylinder 31, encircling the rod 32', one end of the spring bearing upon the underside of the head of the piston 32, while the opposite end abuts the cap 38 of the cylinder. The cylinder 31 includes a lug 39 for pivotal mounting between a pair of spaced ears 40 formed upon a cap 41 of a hydraulic cylinder 42; the pivot 39' therefor being an integral part of the oscillatable disk. The cylinder 42 has at its end opposite the cap, a gland 43 and packing ring 44, a piston 45 which includes a rod being reciprocably received through the ring 44, the outer end of the rod being apertured to receive a pintle 46 of the adjusting plate 29.

The cylinder 42 may have a conduit 47 whereby to replenish the liquid therein or this conduit may be associated with a constant liquid supply, if desired. Also, it should be understood, that air may be employed, instead of liquid, and in such event, the conduit will be associated with a suitable air supply, consisting in either case of a master cylinder, same being subject to definite pressure adjustment shown on the instrument panel.

A segmental worm pinion 48 is suitably mounted upon the periphery of the adjusting disk 29, and in mesh with the teeth of the pinion there is a worm gear 49, suitably mounted in a bracket 50 carried by the mounting disk 11. The worm gear 49 will be driven by a suitable flexible shafting from the transmission of the vehicle, and will, of course, include a suitable gear drive inside of the transmission or by any other source of rotation for rendering the raising and lowering mechanism operative or inoperative, as desired.

A sprocket wheel 50 is keyed upon the shaft 22, aligned with a similar sprocket 51, mounted in the hollow arm 52, and a chain 53 trained around these sprockets transmits rotation of the wheel axle 54 upon which the sprocket 51 is mounted. The arm 52 is of elongated form having a head 55, flanged as at 56 for bolting to the oscillatable disk 14, the free or swinging end 57 being enlarged to provide a housing for the sprocket 51. The axle 54 will be journalled in bearings, as at 58 and 59, and upon the outer end thereof there is mounted a traction wheel 60, which will include a suitable braking means 61, cooperable with a drum 62. The foregoing explanation of transmitting power to the driving wheels is only one of several different means whereby this can be accomplished.

The arm 52 preferably has a removable plate 63 whereby access may be had to the interior of the arm and in operation the arm will house a lubricant conducive to long life of the driving mechanism and a minimum of attention while the vehicle is in operation.

In use, a vehicle equipped with my invention permits each wheel mounting to partake of movements in accordance with road surfaces. Thus, if a wheel encounters a sudden rise in the road, the arm 52 will swing upwardly in a vertical plane and since the arm is connected to the oscillatable disk 14, the shock absorbing device 30 will function to retard shock to the vehicle, due to compression of the spring 37 and retardation to movement of the piston 45 by the liquid in the cylinder 42, rebound being taken care of through the spring 35.

Should it become desirable to vary the setting of the arm 52, the gear 49 will be actuated, imparting motion to the adjusting disk 29, and since the oscillatable plate 14 is interconnected therewith through the shock absorbing mechanism, the plate will also be rotated to position the arm 52 as desired. This will be found advantageous when travelling over land, water or roads where obstructions may be encountered and it is desirable to have greater clearance; and also in repair of the vehicle, the arms may be moved to substantially a vertical position affording ample clearance, permitting a mechanic to move beneath the car in comfort.

While I have shown and described a preferred construction as applied to a motor vehicle, this is by way of illustration only, for I am aware that modifications may be made, and that the device may be applied to trucks, tanks, airplanes, and in particular to a conveyance intended for both land and water travel, since by the elimination of the usual exposed mechanism an entirely enclosed vehicle body construction is made possible by my invention, eliminating not only the usual parasite resistance of exposed mechanism, but making possible a highly streamlined body, also possessing nautical lines to enable same to negotiate either land or water as well as to make possible successful mounting of power plant in rear of said vehicles.

I claim:—

1. An independent wheel mounting comprising a hub, an oscillatable plate associated therewith, a rotatable adjustable plate on the hub, an arm on the oscillatable plate, a traction wheel on the arm, a drive shaft journalled in the oscillatable plate, drive means between the drive shaft and the traction wheel, resilient compressible means connecting the oscillatable plate and the adjustable plate, and exterior means for rotatively adjusting the last named plate.

2. An independent wheel mounting comprising a casing having means for mounting upon the chassis or body of a vehicle and an open end, the casing further having a hub, an oscillatable plate journalled in the hub and closing the open end thereof, a drive shaft journalled in the hub of the oscillatable plate, a hollow arm on the oscillatable plate and having a traction wheel, drive means between the drive shaft and the traction wheel, a rotatively adjustable plate on the hub of the casing, resilient compressible means inter-connecting the oscillatable and adjustable plates, and means for rotating the last named plate.

3. An independent wheel mounting comprising a casing having means for mounting upon the chassis or body of a vehicle and an open end, the casing further having a hub, an oscillatable plate journalled in the hub and closing the open end thereof, a drive shaft journalled in the hub of the oscillatable plate, a hollow arm on the oscillatable plate and having a traction wheel, drive means between the drive shaft and the traction wheel, a rotatively adjustable plate on the hub of the casing, resilient compressible means interconnecting the oscillatable and adjustable plates, a segmental gear on the adjustable plate, a worm gear in mesh therewith, and means for actuating the worm gear.

4. An independent wheel mounting comprising a casing having means for mounting upon the chassis of a motor vehicle and an open end, the casing further having a hub, an oscillatable plate journalled in the hub and closing the open end of the casing, a drive shaft journalled in the hub of the oscillatable plate, a sprocket wheel on the shaft, a hollow arm on the oscillatable plate and enclosing the sprocket wheel, an axle journalled in the free end of the hollow arm, a traction wheel keyed to the axle, a sprocket wheel on the axle aligned with the first named sprocket wheel, a chain trained around the sprockets whereby to impart rotation to the traction wheel; a rotatively adjustable plate on the hub of the casing; a shock absorbing means including a cylinder having a piston and rod, spring means in the cylinder retarding action of the piston, said piston rod being anchored to the adjusting plate and said cylinder being anchored to the oscillatable plate, a hydraulic means including a cylinder, piston and rod, said cylinder being pivotally connected to the anchorage of the first named cylinder, said rod being pivotally connected to the adjustable plate, a further cylinder and piston interconnected between the oscillatable and rotatably adjustable plates; a segmental gear secured to the periphery of the adjustable plate, a worm gear in mesh therewith, and means for actuating the worm gear whereby to impart motion to the oscillatable and rotatable plates.

FRED W. KRAMER.